United States Patent
Nishida et al.

(10) Patent No.: US 9,975,200 B2
(45) Date of Patent: May 22, 2018

(54) FRICTION STIR WELDING APPARATUS WITH AN L-SHAPED SUPPORT

(71) Applicant: KAWASAKI JUKOGYO KABUSHIKI KAISHA, Kobe-shi, Hyogo (JP)

(72) Inventors: Hidehito Nishida, Kobe (JP); Syuhei Yoshikawa, Kobe (JP); Mitsuhiro Kamioka, Kobe (JP); Shirou Honma, Kobe (JP); Toshiyuki Hirashima, Kobe (JP); Kenji Waki, Kobe (JP)

(73) Assignee: KAWASAKI JUKOGYO KABUSHIKI KAISHA, Kobe-Shi (JP)

( * ) Notice: Subject to any disclaimer, the term of this patent is extended or adjusted under 35 U.S.C. 154(b) by 145 days.

(21) Appl. No.: 14/784,888

(22) PCT Filed: Apr. 15, 2014

(86) PCT No.: PCT/JP2014/002130
§ 371 (c)(1),
(2) Date: Oct. 15, 2015

(87) PCT Pub. No.: WO2014/171132
PCT Pub. Date: Oct. 23, 2014

(65) Prior Publication Data
US 2016/0074957 A1 Mar. 17, 2016

(30) Foreign Application Priority Data

Apr. 16, 2013 (JP) .................. 2013-085899

(51) Int. Cl.
*B23K 20/12* (2006.01)
*B23K 37/02* (2006.01)

(52) U.S. Cl.
CPC .......... *B23K 20/122* (2013.01); *B23K 20/123* (2013.01); *B23K 20/125* (2013.01);
(Continued)

(58) Field of Classification Search
CPC ...................... B23K 20/122–20/128
See application file for complete search history.

(56) References Cited

U.S. PATENT DOCUMENTS 6,199,745 B1 * 3/2001 Campbell ............ B23K 20/123
228/112.1
6,237,835 B1 5/2001 Litwinski et al.
(Continued)

FOREIGN PATENT DOCUMENTS

CA 2474867 A1 * 8/2003 ........... B23K 20/123
FR 2 922 796 A1 5/2009
(Continued)

OTHER PUBLICATIONS

Sep. 26, 2016 Extended Search Report issued in European Patent Application No. 14785290.9.
(Continued)

*Primary Examiner* — Erin B Saad
*Assistant Examiner* — Carlos J Gamino
(74) *Attorney, Agent, or Firm* — Oliff PLC (57) ABSTRACT

A friction stir welding apparatus includes: a rotating shaft, on which a thread for friction stirring is formed; and a drive unit rotatably supporting the rotating shaft. A rotating shoulder configured to rotate together with the rotating shaft to generate frictional heat between the rotating shoulder and back surfaces of workpieces is fixed to a distal end of the rotating shaft. The rotating shoulder is pushed against the back surfaces of the workpieces by a pushing mechanism. A stationary shoulder penetrated by the rotating shaft and configured to hold the workpieces in a sandwiching manner together with the rotating shoulder is non-rotatably mounted to the drive unit or a member connected to the drive unit.

8 Claims, 8 Drawing Sheets (52) U.S. Cl.
CPC .......... *B23K 20/126* (2013.01); *B23K 20/128* (2013.01); *B23K 20/1255* (2013.01); *B23K 37/0235* (2013.01); *B23K 37/0282* (2013.01); *B23K 37/0294* (2013.01)

(56) References Cited

U.S. PATENT DOCUMENTS

| | | | | |
|---|---|---|---|---|
| 6,497,355 | B1* | 12/2002 | Ding | B23K 20/123 228/102 |
| 6,499,649 | B2* | 12/2002 | Sayama | B23K 20/122 228/112.1 |
| 6,758,382 | B1* | 7/2004 | Carter | B23K 20/12 228/112.1 |
| 6,799,708 | B2 | 10/2004 | von Strombeck et al. | |
| 6,865,919 | B2* | 3/2005 | Litwinski | B23K 20/1275 72/253.1 |
| 7,455,212 | B2* | 11/2008 | Mika | B23K 20/1245 228/112.1 |
| 7,686,202 | B1* | 3/2010 | Carter | B23K 20/1255 228/2.1 |
| 7,909,225 | B2* | 3/2011 | Henneboehle | B23K 20/1245 228/2.1 |
| 8,079,276 | B2* | 12/2011 | Sylva | G01L 5/0076 73/862.541 |
| 8,164,021 | B1* | 4/2012 | Ferrando | B23K 20/1255 219/78.13 |
| 9,457,513 | B2* | 10/2016 | Hutsch | B23K 20/1255 |
| 2002/0092888 | A1* | 7/2002 | Ezumi | B23K 20/1245 228/112.1 |
| 2002/0179673 | A1* | 12/2002 | Strombeck | B65C 7/00 227/67 |
| 2003/0141343 | A1 | 7/2003 | Murakami | |
| 2003/0192941 | A1* | 10/2003 | Ishida | B23K 20/123 228/112.1 |
| 2003/0201307 | A1* | 10/2003 | Waldron | B23K 20/122 228/112.1 |
| 2003/0209588 | A1* | 11/2003 | Colligan | B23K 20/1255 228/112.1 |
| 2006/0006209 | A1* | 1/2006 | Loitz | B23K 20/1255 228/2.1 |
| 2006/0006211 | A1* | 1/2006 | Loitz | B23K 20/126 228/112.1 |
| 2006/0043151 | A1* | 3/2006 | Stol | B23K 20/1255 228/2.1 |
| 2006/0043152 | A1* | 3/2006 | Stol | B23K 20/1255 228/2.1 |
| 2008/0217377 | A1* | 9/2008 | Stol | B23K 20/1255 228/2.3 |
| 2009/0123778 | A1* | 5/2009 | Russell | B23K 20/1235 428/661 |
| 2009/0152328 | A1* | 6/2009 | Okamoto | B23K 20/126 228/112.1 |
| 2009/0184201 | A1* | 7/2009 | Talwar | B23K 20/1255 244/119 |
| 2010/0288820 | A1* | 11/2010 | Aliaga | B23K 20/1255 228/112.1 |
| 2012/0193401 | A1* | 8/2012 | Hori | B23K 20/1265 228/112.1 |
| 2012/0248174 | A1* | 10/2012 | dos Santos | B23K 20/122 228/2.1 |
| 2012/0298724 | A1* | 11/2012 | Kato | B23K 20/1245 228/2.1 |
| 2012/0328837 | A1* | 12/2012 | Goehlich | B23K 20/1255 428/156 |
| 2013/0056525 | A1* | 3/2013 | Ostersehlte | B23K 20/123 228/114 |
| 2013/0119115 | A1* | 5/2013 | Kato | B23K 20/1255 228/112.1 |
| 2013/0206817 | A1 | 8/2013 | Tavares et al. | |
| 2014/0119814 | A1* | 5/2014 | Osikowicz | B23K 20/1255 403/270 |
| 2014/0231490 | A1* | 8/2014 | Sato | B23K 20/126 228/2.1 |
| 2014/0326392 | A1* | 11/2014 | Silvanus | B23K 20/1255 156/73.5 |
| 2017/0157699 | A1* | 6/2017 | Anzai | B23K 20/125 |

FOREIGN PATENT DOCUMENTS

| | | |
|---|---|---|
| JP | 2003-062681 A | 3/2003 |
| JP | 2006-021250 A | 1/2006 |
| JP | 2007-144458 A | 6/2007 |
| JP | 4052443 B2 | 2/2008 |
| WO | 2006/081819 A1 | 8/2006 |
| WO | 2012/007573 A1 | 1/2012 |

OTHER PUBLICATIONS

Jul. 1, 2014 Search Report issued in International Patent Application No. PCT/JP2014/002130.

Oct. 20, 2015 International Preliminary Report on Patentability issued in International Patent Application No. PCT/JP2014/002130.

\* cited by examiner

FRICTION STIR WELDING APPARATUS WITH AN L-SHAPED SUPPORT

TECHNICAL FIELD

The present invention relates to an apparatus for and a method of joining together workpieces abutting each other by friction stir welding.

BACKGROUND ART

Conventionally, a friction stir welding apparatus including a probe-type rotary tool is known as a friction stir welding apparatus for joining together workpieces abutting each other. The probe of the probe-type rotary tool protrudes from an end face of a cylindrical body of the rotary tool. The rotary tool is, while being rotated, moved along a boundary between the workpieces in a state where the axial direction of the rotary tool is inclined relative to the workpieces, i.e., in such a manner that a part of the body of the rotary tool is inserted into the workpieces. As a result, a recess is formed on the front surface side of a weld joint.

In recent years, a bobbin-type rotary tool including a pair of shoulders for holding workpieces in a sandwiching manner, the shoulders being provided on both sides of a probe, respectively, has been developed. The bobbin-type rotary tool is, while being rotated, moved along a boundary between the workpieces in a state where the axial direction of the rotary tool is perpendicular to the workpieces.

For example, Patent Literature 1 discloses a friction stir welding apparatus capable of causing a first shoulder and a second shoulder to rotate at different rotation speeds. The first shoulder rotates on front surfaces of workpieces, and the second shoulder rotates on back surfaces of the workpieces.

CITATION LIST

Patent Literature

PTL 1: Japanese Patent No. 4052443

SUMMARY OF INVENTION

Technical Problem

The friction stir welding apparatus disclosed in Patent Literature 1 is intended to solve the following problem: in a case where there is a gap between the workpieces abutting each other, a recess is formed in the weld joint. In order to prevent the formation of a recess on the front surface side of the weld joint, which is visible from outside, the rotation speed of the second shoulder on the back surface side is made faster than the rotation speed of the first shoulder on the front surface side. As a result, the back surface side of the workpieces becomes softened before the front surface side of the workpieces does. This makes it possible to prevent the formation of a recess on the front surface side of the weld joint even if there is a gap between the workpieces.

Figure 5A:
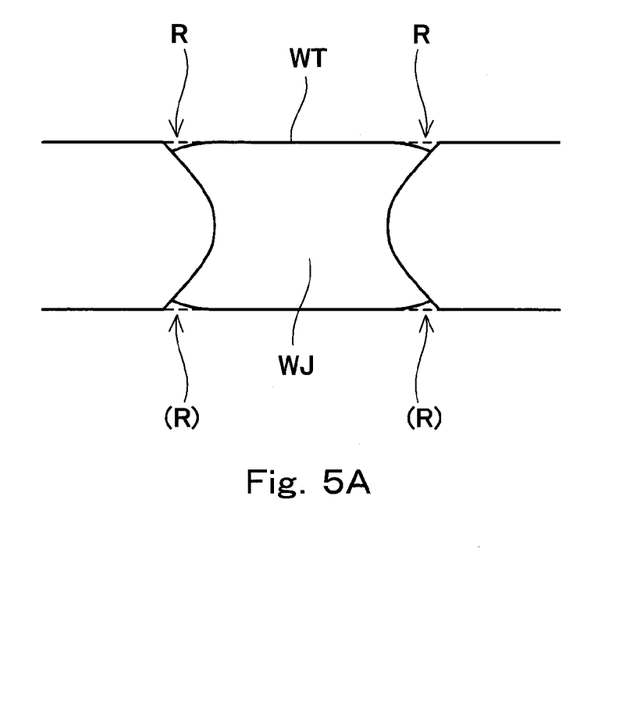
FIG. 5A shows a result of joining together workpieces abutting each other with no gap therebetween by using a conventional bobbin-type rotary tool.

The inventors of the present invention have found out that, in the case of using a bobbin-type rotary tool, even if there is no gap between the workpieces, liner recesses R are formed on both sides of a welding trace WT on the front surface side of a weld joint WJ as shown in FIG. 5A, and they have ascertained that the recesses R are unavoidably formed since the shoulders generate frictional heat. Therefore, such recesses on both sides of a welding trace on the front surface side of a weld joint are similarly formed also in the case of using the friction stir welding apparatus disclosed in Patent Literature 1, which is used under the assumption that there is a gap between the workpieces.

In view of the above, an object of the present invention is to provide a friction stir welding apparatus and a friction stir welding method capable of preventing the formation of recesses on both sides of a welding trace on the front surface side of a weld joint regardless of the presence or absence of a gap between the workpieces.

Solution to Problem

In order to solve the above-described problems, a friction stir welding apparatus according to the present invention is an apparatus for joining together workpieces abutting each other by friction stir welding, the apparatus including: a rotating shaft, on which a thread for friction stirring is formed; a rotating shoulder fixed to a distal end of the rotating shaft and configured to rotate together with the rotating shaft to generate frictional heat between the rotating shoulder and back surfaces of the workpieces; a drive unit rotatably supporting the rotating shaft on a front surface side of the workpieces, the drive unit including a motor configured to rotate the rotating shaft; a pushing mechanism configured to push the rotating shoulder against the back surfaces of the workpieces; and a stationary shoulder penetrated by the rotating shaft and configured to hold the workpieces in a sandwiching manner together with the rotating shoulder, the stationary shoulder being non-rotatably mounted to the drive unit or a member connected to the drive unit.

According to the above configuration, the stationary shoulder does not rotate on the front surface side of the workpieces. Accordingly, frictional heat causing the softening of the workpieces is not generated on the front surface side of the workpieces. Therefore, not only in a case where there is no gap between the workpieces, but also in a case where there is a gap between the workpieces, the formation of recesses on both sides of a welding trace on the front surface side of a weld joint can be prevented.

The above friction stir welding apparatus may further include an urging member configured to push the stationary shoulder against front surfaces of the workpieces. According to this configuration, even if there is undulation on the front surfaces of the workpieces, the stationary shoulder can follow the undulation.

The above friction stir welding apparatus may further include a detector configured to detect a pushing force of the rotating shoulder against the back surfaces of the workpieces. The pushing mechanism may be configured to operate in accordance with a detection value of the detector. Alternatively, the pushing mechanism may be configured to operate in accordance with a current value of the motor. According to these configurations, the pushing force of the rotating shoulder against the back surfaces of the workpieces can be kept constant.

The thread may be further formed on a part of the rotating shaft where the rotating shaft overlaps the stationary shoulder. A wire-feeding groove, through which a wire made of a material that is able to be stirred together with the workpieces is fed to the thread, may be formed in a surface of the stationary shoulder, the surface facing the rotating shoulder, such that the wire-feeding groove extends from a central hole, through which the rotating shaft is inserted, and the wire-feeding groove extends in a joining direction, the joining direction being a direction in which the rotating shaft is moved along a boundary between the workpieces.

According to this configuration, formation of a recess over the entire back surface side of the weld joint can be suppressed.

The above friction stir welding apparatus may further include a pushing roller disposed in the joining direction relative to the stationary shoulder and configured to push the wire against front surfaces of the workpieces. According to this configuration, the wire can be fed to the thread by utilizing relative movement between the rotating shaft and the workpieces.

A shaping die may be formed in or on a surface of the stationary shoulder, the surface facing the rotating shoulder, such that the shaping die extends from a central hole, through which the rotating shaft is inserted, and the shaping die extends in a direction opposite to a joining direction, the joining direction being a direction in which the rotating shaft is moved along a boundary between the workpieces. According to this configuration, a liner convex or concave can be formed on the front surface side of the weld joint at the same time as performing the joining of the workpieces.

The above friction stir welding apparatus may further include a support slidably connected to the drive unit such that the support and the drive unit are movable relative to each other in an axial direction of the rotating shaft. The pushing mechanism may move the drive unit relative to the support, and the stationary shoulder may be mounted to the support. According to this configuration, the pushing force of the stationary shoulder against the front surfaces of the workpieces and the pushing force of the rotating shoulder against the back surfaces of the workpieces can be adjusted independently of each other.

A friction stir welding method according to the present invention is a method of joining together workpieces abutting each other by friction stir welding, the method including: moving a rotating shaft, on which a thread for friction stirring is formed, along a boundary between the workpieces while rotating the rotating shaft in a manner to keep the rotating shaft perpendicular to the workpieces in a state where a rotating shoulder fixed to a distal end of the rotating shaft is pushed against back surfaces of the workpieces and a non-rotatable stationary shoulder penetrated by the rotating shaft is pushed against front surfaces of the workpieces.

For example, the thread may be further formed on a part of the rotating shaft where the rotating shaft overlaps the stationary shoulder. A wire-feeding groove may be formed in a contact surface of the stationary shoulder, the contact surface contacting the workpieces, such that the wire-feeding groove extends from a central hole, through which the rotating shaft is inserted, and the wire-feeding groove extends in a joining direction, the joining direction being a direction in which the rotating shaft is moved along the boundary between the workpieces. The friction stir welding method may include moving the rotating shoulder in the joining direction and feeding a wire to the thread through the wire-feeding groove, the wire being made of a material that is able to be stirred together with the workpieces.

Advantageous Effects of Invention

According to the present invention, formation of recesses on both sides of a welding trace on the front surface side of a weld joint can be prevented regardless of the presence or absence of a gap between the workpieces.

DESCRIPTION OF EMBODIMENTS

Figure 1:
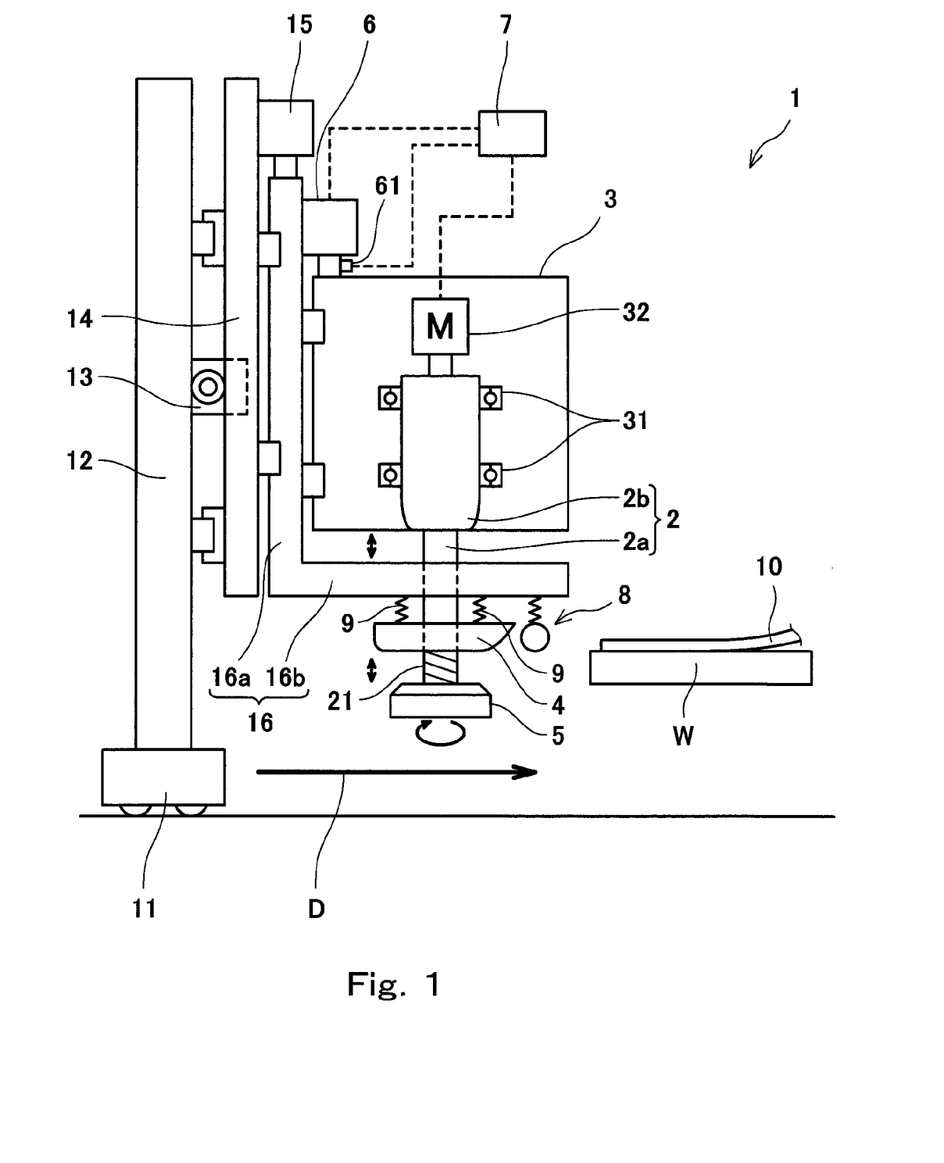
FIG. 1 shows the configuration of a friction stir welding apparatus according to one embodiment of the present invention.

FIG. 1 shows a friction stir welding apparatus 1 according to one embodiment of the present invention. The apparatus 1 is designed to join together workpieces W abutting each other by friction stir welding. The apparatus 1 includes: a rotating shaft 2 extending vertically; and a drive unit 3 holding the upper part of the rotating shaft 2. In the present embodiment, the apparatus 1 includes: a lifting/lowering device 14, a transversely moving device 12, and a running device 11, which are configured to move the drive unit 3 three dimensionally via a support 16; and a controller 7 for performing overall control.

Figure 8:
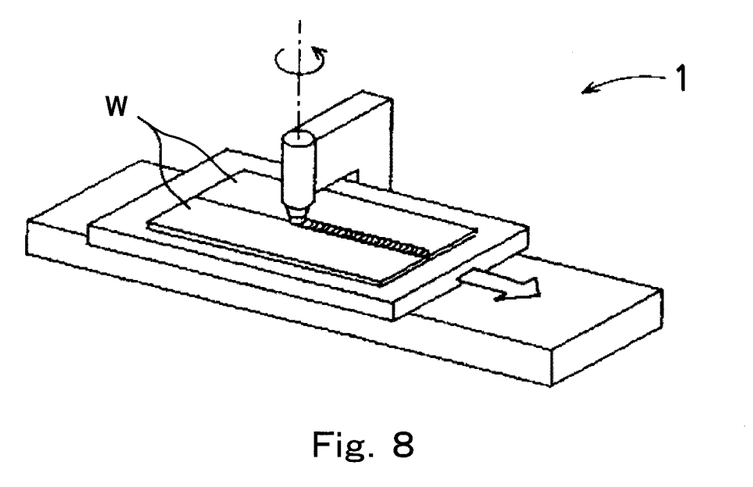
FIG. 8 is a perspective view showing a friction stir welding apparatus of a movable table type.
Figure 9:
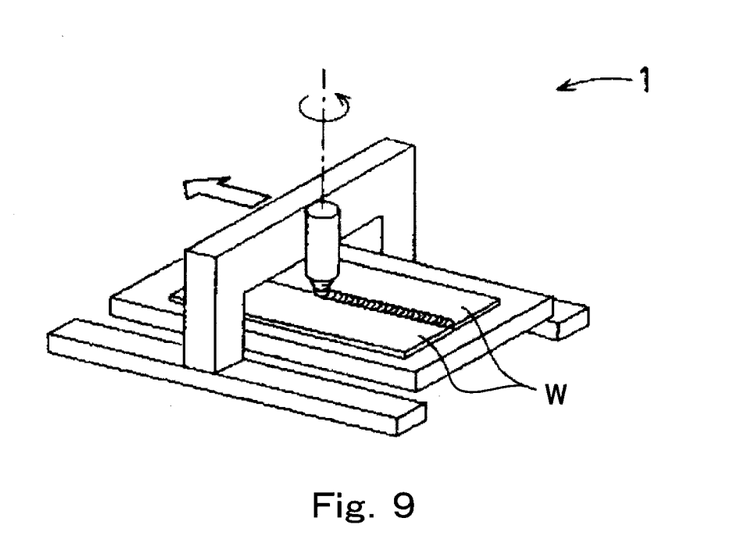
FIG. 9 is a perspective view showing a friction stir welding apparatus of a gantry type.
Figure 10:
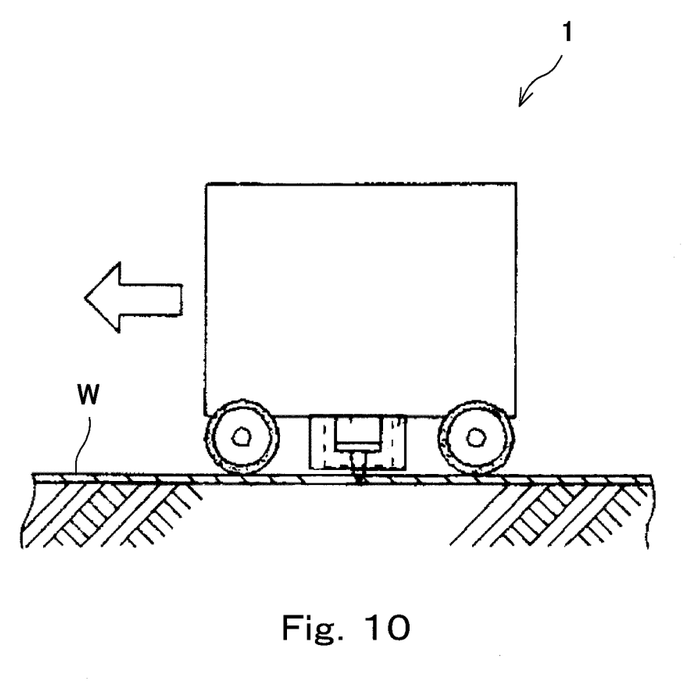
FIG. 10 is a side view showing a friction stir welding apparatus of an automatic truck type.

However, the configuration of the friction stir welding apparatus 1 is not limited to the one shown in FIG. 1. For example, the friction stir welding apparatus 1 may be configured as a movable table type as shown in FIG. 8, a gantry type as shown in FIG. 9, or an automatic truck type as shown in FIG. 10. That is, the friction stir welding apparatus 1 may be configured in any manner, so long as the apparatus 1 is configured such that the rotating shaft 2 is moved relative to the workpieces W.

Figure 4A:
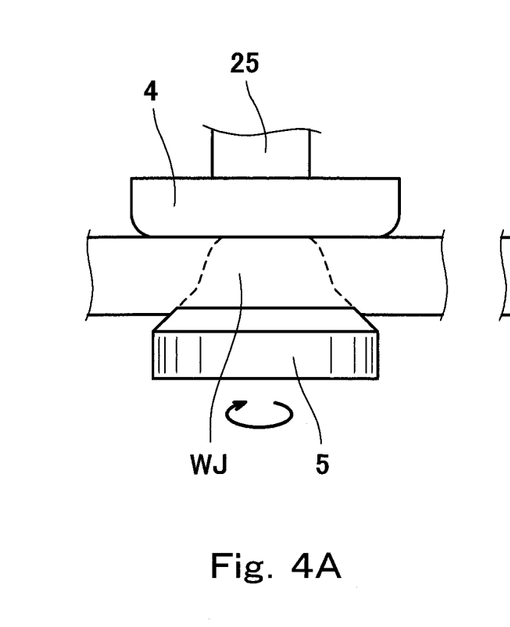
FIG. 4A is a sectional view taken along line IVA-IVA of FIG. 2.
Figure 4B:
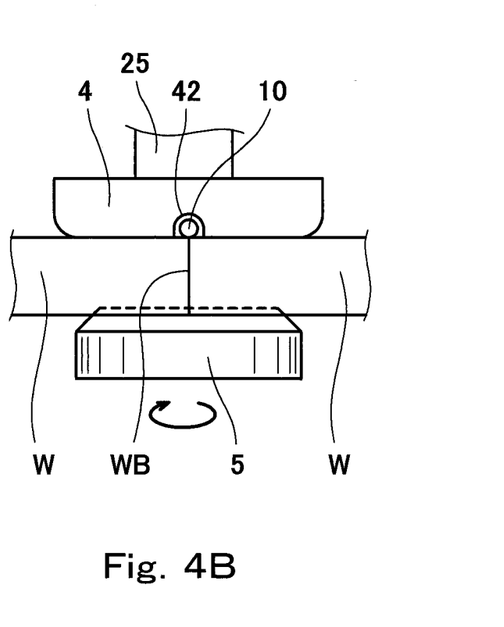
FIG. 4B is a sectional view taken along line IVB-IVB of FIG. 2.

The workpieces W are placed on a fixed base, which is not shown. As shown in FIG. 4B, the workpieces W may be arranged side by side in the horizontal direction such that their end faces are in contact with each other, or may be arranged side by side such that a gap is formed between their end faces. The running device 11 moves the rotating shaft 2 in a direction indicated by an arrow D in FIG. 1 along a boundary WB between the workpieces W. That is, the direction indicated by the arrow D is a joining direction.

In the present embodiment, each workpiece W is a plate-shaped member whose front surface faces upward and whose back surface faces downward. The drive unit 3 is positioned above the workpieces W, i.e., positioned on the front surface side of the workpieces W. However, the facing directions of the surfaces of each workpiece W may be the opposite directions to those in the present embodiment, and the side on which the drive unit 3 is positioned may be the opposite side to that in the present embodiment. Moreover, the workpieces W need not be in a horizontal orientation. Instead, the workpieces W may be in a vertical or diagonal orientation. That is, the axial direction of the rotating shaft 2 may be any direction, so long as the axial direction is perpendicular to the workpieces W.

In addition, the workpieces W need not be plate-shaped members, but may alternatively be tubular members. In a case where each workpiece W is a tubular member, the outer peripheral surface of the workpiece W is the front surface, and the inner peripheral surface of the workpiece W is the back surface. In this case, for example, an articulated robot may be used to swirl the drive unit 3 around the workpieces W. Further alternatively, each workpiece may be one of the skins of a double-skin member.

The rotating shaft 2 includes a larger-diameter portion 2b accommodated in the drive unit 3 and a smaller diameter portion 2a protruding downward from the drive unit 3. The larger-diameter portion 2b is rotatably supported by the drive unit 3 via bearings 31. The drive unit 3 includes a motor 32 configured to rotate the rotating shaft 2. It should be noted that it is not essential for the larger-diameter portion 2b to be entirely accommodated in the drive unit 3. For example, the lower part of the larger-diameter portion 2b may protrude downward from the drive unit 3 to a horizontal portion 16b of the support 16. The horizontal portion 16b will be described below.

The support 16 is L-shaped in side view. The support 16 includes a vertical portion 16a positioned laterally to the drive unit 3 and a horizontal portion 16b positioned below the drive unit 3. The drive unit 3 is slidably connected to the vertical portion 16a of the support 16, such that the drive unit 3 and the vertical portion 16a of the support 16 are movable relative to each other in the axial direction of the rotating shaft 2, i.e., in the vertical direction.

The vertical portion 16a of the support 16 is connected to the lifting/lowering device 14, and is lifted and lowered by a drive mechanism 15 of the lifting/lowering device 14. The lifting/lowering device 14 is connected to the transversely moving device 12, and is transversely moved by a drive mechanism 13 of the transversely moving device 12. The transversely moving device 12 is connected to the self-propelled running device 11. It should be noted that the position of the lifting/lowering device 14 and the position of the transversely moving device 12 may be switched with each other.

Each of the drive mechanism 15 of the lifting/lowering device 14 and the drive mechanism 13 of the transversely moving device 12 may be, for example, a combination of a motor, a screw shaft, and a nut member, or may be a hydraulic, pneumatic, or electric cylinder. Each of the drive mechanisms 13 and 15 may be a manually operated mechanism.

The vertical portion 16a of the support 16 is provided with a pushing mechanism 6, which is configured to move the drive unit 3 in the vertical direction relative to the support 16. The pushing mechanism 6 serves to push a rotating shoulder 5 against the back surfaces of the workpieces W. The rotating shoulder 5 will be described below. In the present embodiment, the pushing mechanism 6 is a combination of a motor, a screw shaft, and a nut member. However, alternatively, the pushing mechanism 6 may be a combination of a motor, a rack, and a pinion, for example. Further alternatively, the pushing mechanism 6 may be a hydraulic, pneumatic, or electric cylinder.

In the present embodiment, the screw shaft of the pushing mechanism 6 is provided with a load cell, which serves as a detector 61 for detecting the pushing force of the rotating shoulder 5 against the back surfaces of the workpieces W. It should be noted that, in the case of adopting a hydraulic or pneumatic cylinder as the pushing mechanism 6, a pressure gauge that detects an internal cylinder pressure or internal pipe pressure can be used as the detector 61. Alternatively, in the case of using an electric cylinder as the pushing mechanism 6, since the value of a current flowing through the electric cylinder is correlated with the pushing force of the rotating shoulder 5 against the back surfaces of the workpieces W, an ammeter that measures the current value can be used as the detector 61.

Next, the configuration around the smaller diameter portion 2a of the rotating shaft 2 is described in detail with reference to FIG. 2 to FIG. 4B.

Figure 2:
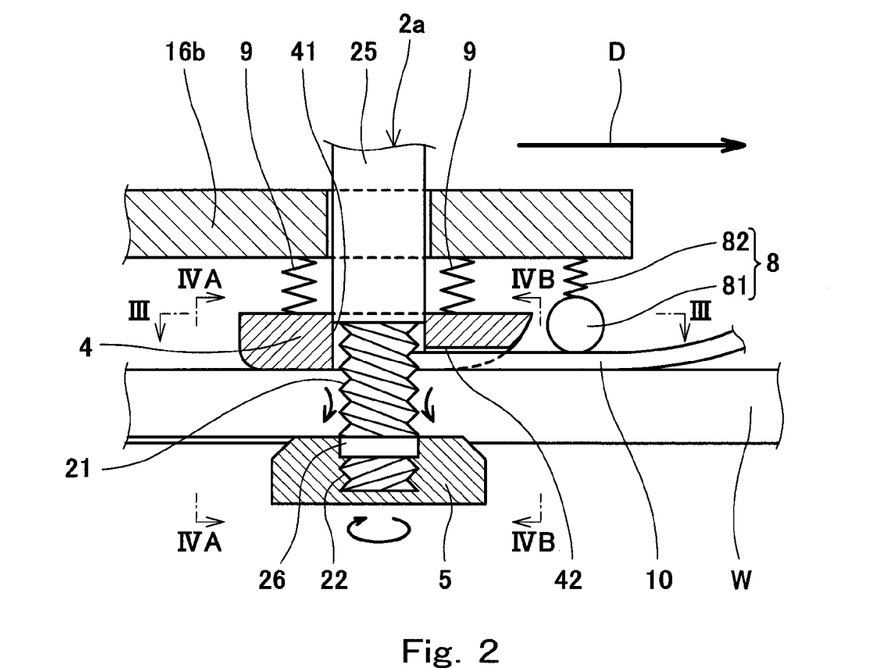
FIG. 2 is an enlarged sectional view of an essential part of the friction stir welding apparatus shown in FIG. 1.

The smaller diameter portion 2a of the rotating shaft 2 extends in a manner to penetrate the horizontal portion 16b of the support 16. The rotating shoulder 5 is fixed to the distal end of the smaller diameter portion 2a. A stationary shoulder 4, which is penetrated by the smaller diameter portion 2a of the rotating shaft 2, is non-rotatably mounted to the horizontal portion 16b of the support 16, and holds the workpieces W in a sandwiching manner together with the rotating shoulder 5. Specifically, the stationary shoulder 4 includes a central hole 41, through which the smaller diameter portion 2a of the rotating shaft 2 is inserted.

In the present embodiment, the smaller diameter portion 2a includes: a body 25 continuous with the larger-diameter portion 2b; and a pin 26 extending downward from the body 25 and having a smaller diameter than the body 25. The length of the body 25 is set such that the lower end of the body 25 is positioned inside the central hole 41 of the stationary shoulder 4 (to be more precise, at an upper position inside the central hole 41). The lower portion of the pin 26 is inserted in the rotating shoulder 5.

A thread 21 for friction stirring is formed on the pin 26 above the rotating shoulder 5. When seen in the direction from the stationary shoulder 4 to the rotating shoulder 5, the spiral direction of the thread 21 is opposite to the rotation direction of the rotating shaft 2. Therefore, in the vicinity of the thread 21, softened portions of the workpieces W softened as a result of friction against the thread 21 flow toward the rotating shoulder 5.

In the present embodiment, the thread 21 is formed on the entirety of a portion of the pin 26, the portion being positioned above the rotating shoulder 5. In other words, the thread 21 is formed also on a part of the smaller diameter portion 2a of the rotating shaft 2 where the smaller diameter portion 2a overlaps the stationary shoulder 4.

A thread 22 is formed on the lower part of the inserted portion of the pin 26 inserted in the rotating shoulder 5. The thread 22 serves to fix the rotating shoulder 5. A bottomed screw hole, into which the thread 22 is screwed, is formed in the rotating shoulder 5. It should be noted that the manner of fixing the rotating shoulder 5 is not thus limited. For example, the screw hole formed in the rotating shoulder 5 need not be a bottomed screw hole, and the rotating shoulder 5 may be fixed to the pin 26 by means of a locking screw.

The rotating shoulder 5 rotates together with the rotating shaft 2, thereby generating frictional heat between the rotating shoulder 5 and the back surfaces of the workpieces W. The rotating shoulder 5 is a discoid member whose upper surface and lower surface are parallel to each other. That is, the upper surface of the rotating shoulder 5 is a contact surface contacting the workpieces W. The peripheral portion of the upper surface of the rotating shoulder 5 is formed as a tapered surface.

Figure 3:
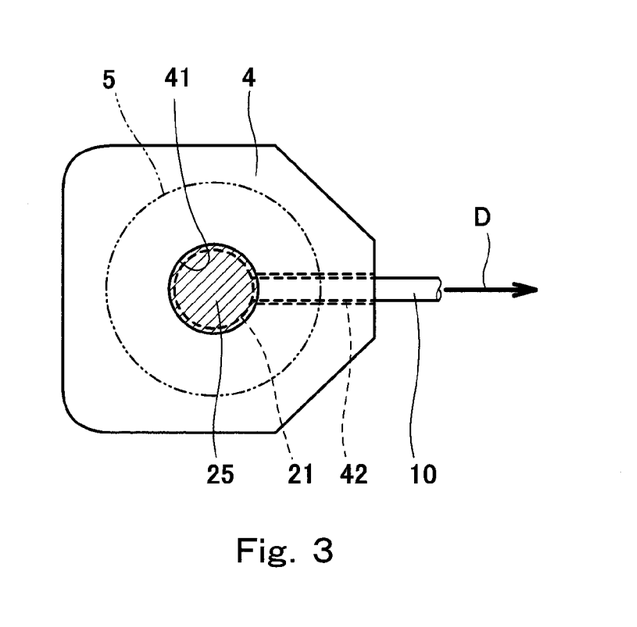
FIG. 3 is a sectional view taken along line of FIG. 2.

As shown in FIG. 3, when seen in plan view, the stationary shoulder 4 is substantially home base shaped and pointed in the joining direction D. It should be noted that the shape of the stationary shoulder 4 is not limited to such a shape. For example, when seen in plan view, the stationary shoulder 4 may have a round or polygonal shape. The diameter of the above-described central hole 41 is slightly greater than the diameter of the body 25 of the smaller diameter portion 2a.

The upper surface of the stationary shoulder 4 is horizontally flat. The lower surface of the stationary shoulder 4, which is a surface facing the rotating shoulder 5, is formed such that a portion thereof on the joining direction D side is raised in the joining direction D, and the remaining portion is parallel to the upper surface. That is, the lower surface of the stationary shoulder 4, other than its portion raised in the joining direction D, serves as a contact surface contacting the workpieces W. The edges of the contact surface are rounded to be arc-shaped in cross section.

A wire-feeding groove 42 extending in the joining direction D from the central hole 41 is formed in the lower surface of the stationary shoulder 4. The wire-feeding groove 42 serves to feed a wire 10 to the thread 21. The wire 10 is made of a material that can be stirred together with the workpieces W. When the wire 10 is fed to the thread 21 through the wire-feeding groove 42, fluidization of the wire 10 occurs due to frictional heat generated between the wire 10 and the thread 21, and the wire 10 is friction-stirred together with the workpieces W.

The wire 10 may be made of the same material as that of the workpiece W. Alternatively, the wire 10 may contain a component slightly different from a component contained in the workpiece W. However, since frictional heat that causes fluidization of the workpiece W is lower, by approximately 100° C. or more, than the melting point of the workpiece W, it is desirable for the wire 10 not to melt due to that frictional heat.

In the present embodiment, an adjusting mechanism 8, which adjusts the feed amount of the wire 10 fed to the thread 21, is provided on the horizontal portion 16b of the support 16. That is, the adjusting mechanism 8 is disposed in the joining direction D relative to the stationary shoulder. Specifically, the adjusting mechanism 8 includes: a pushing roller 81 configured to push the wire 10 against the front surfaces of the workpieces W; and a holder 82, which can change the pushing force of the pushing roller 81. The feed amount of the wire 10 is suitably determined in accordance with the diameter of the wire 10, the pushing force of the rotating shoulder 5, etc. In a case where the feed amount of the wire 10 is large, the wire 10 slidingly moves in a direction opposite to the joining direction D on the front surfaces of the workpieces W. In other words, the wire 10 is drawn into the wire-feeding groove 42 on the workpieces W. In a case where the feed amount of the wire 10 is small, the wire 10 slidingly moves in the joining direction D on the front surfaces of the workpieces W while being pushed by the rotating shaft 2.

A plurality of coil springs are arranged around the smaller diameter portion 2a of the rotating shaft 2 between the stationary shoulder 4 and the horizontal portion 16b of the support 16. The plurality of coil springs serve as urging members 9, which push the stationary shoulder 4 against the front surfaces of the workpieces W. It should be noted that a single coil spring with an internal diameter greater than the diameter of the smaller diameter portion 2a of the rotating shaft 2, through which the smaller diameter portion 2a is inserted, can be used as an urging member 9.

The pushing mechanism 6 for pushing the rotating shoulder 5 against the back surfaces of the workpieces W is configured to operate in accordance with a detection value of the detector 61. Specifically, the detector 61 and the pushing mechanism 6 are connected to the controller 7, and the controller 7 controls the pushing mechanism 6 (to be precise, the motor therein) such that the detection value of the detector 61 is kept within a predetermined range.

Next, a method of performing friction stir welding with use of the apparatus 1 is described. The following description is given assuming that: in advance, the workpieces W are fixed on the fixed base (not shown) in a state where the workpieces W abut each other, and the apparatus 1 is set at such a position that the thread 21 of the rotating shaft 2 comes into contact with end faces of the workpieces W.

First, the drive mechanism 13 of the transversely moving device 12 is operated to position the center of the rotating shaft 2 on the extension of the boundary WB between the workpieces W. Next, the drive mechanism 15 of the lifting/lowering device 14 is operated to move the support 16 to such a position that the stationary shoulder 4 is pushed against the front surfaces of the workpieces W with a suitable pushing force. Further, the pushing mechanism 6 is operated to move the drive unit 3 to such a position that the rotating shoulder 5 is pushed against the back surfaces of the workpieces W with a pushing force that allows the detection value of the detector 61 to be in a predetermined range. Also, the wire 10 is inserted into the wire-feeding groove 42 of the stationary shoulder 4, such that the wire 10 is inserted between the pushing roller 81 of the adjusting mechanism 8 and the workpieces W and the distal end of the wire 10 reaches the thread 21.

In such a state, the controller 7 drives the motor 32 of the drive unit 3 and causes the running device 11 to run. As a result, the rotating shaft 2 is moved along the boundary WB between the workpieces W while being rotated in such a manner that the rotating shaft 2 is kept perpendicular to the workpieces W. In addition, the wire 10 is fed to the thread 21 through the wire-feeding groove 42 of the stationary shoulder 4. It should be noted that, while the running device 11 is running, the controller 7 controls the pushing mechanism 6 such that the detection value of the detector 61 is kept within the predetermined range as mentioned above.

As described above, in the friction stir welding apparatus 1 according to the present embodiment, the stationary shoulder 4 does not rotate on the front surface side of the workpieces W. Accordingly, frictional heat causing the softening of the workpieces W is not generated on the front surface side of the workpieces W. Therefore, not only in a case where there is no gap between the workpieces W, but also in a case where there is a gap between the workpieces W, the formation of recesses on both sides of a welding trace on the front surface side of a weld joint WJ can be prevented.

Figure 5B:
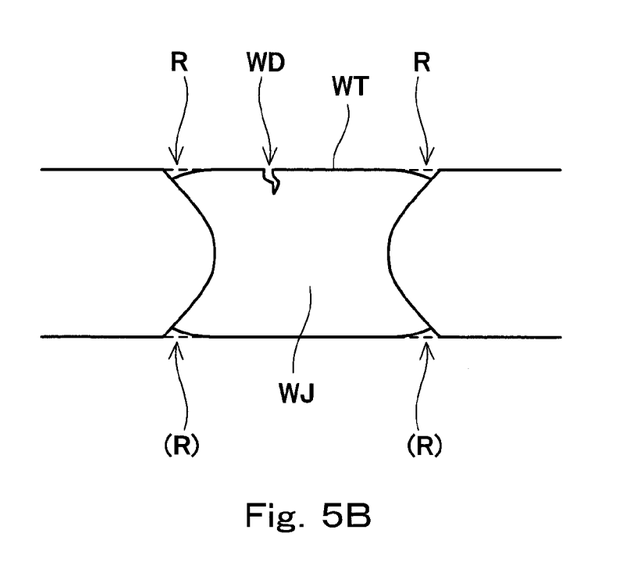
FIG. 5B shows a result of joining together workpieces abutting each other with a large gap therebetween by using the same rotary tool.

In the case of joining the workpieces W together by using a conventional bobbin-type rotary tool, if there is large gap between the workpieces W, then as shown in FIG. 5B, a dent-like defect WD may be formed in the weld joint WJ. Usually, the gap G between the upper and lower shoulders of the bobbin-type rotary tool is set in consideration of the thickness T of the workpiece W, such that T−G>0.1 mm. If T−G<0.1 mm, the defect WD tends to be formed due to insufficient stirring of the material. If the value of T−G is large, the defect WD is not easily formed. However, if the value of T−G is excessively large, the entire back surface side of the weld joint WJ becomes significantly recessed, which is unfavorable. In view of this, preferably, the value of T−G is set to approximately 0.1 to 0.3 mm. In this case, it is desirable that the workpieces W abut each other such that the gap between the workpieces W is 0.5 mm or less. By adopting these settings, the formation of the dent-like defect WD in the weld joint WJ can be prevented.

Further, in the present embodiment, the pushing mechanism 6 is configured to operate in accordance with the detection value of the detector 61. This makes it possible to keep constant the pushing force of the rotating shoulder 5 against the back surfaces of the workpieces W.

Still further, in the present embodiment, the wire 10 is fed to the thread 21 through the wire-feeding groove 42 of the stationary shoulder 4. In this manner, the formation of the recess over the entire back surface side of the weld joint WJ can be suppressed. In addition, feeding the wire 10 in this manner makes it possible to prevent the aforementioned formation of the dent-like defect WD in the weld joint WJ even if there is a large gap between the workpieces W.

Still further, when seen in the direction from the stationary shoulder 4 to the rotating shoulder 5, the spiral direction of the thread 21 is opposite to the rotation direction of the rotating shaft 2. Accordingly, the wire 10 is, after being softened due to the friction with the thread 21, fed into the workpieces W by the rotation of the rotating shaft 2. Consequently, the softened wire 10 is automatically stirred together with a softened portion of the workpieces W.

(Other Embodiments)

The present invention is not limited to the above-described embodiment. Various modifications can be made without departing from the spirit of the invention.

For example, the horizontal portion 16b of the support 16 may be eliminated, and the stationary shoulder 4 may be mounted to the drive unit 3. In this case, the pushing mechanism 6 may double as the lifting/lowering device 14. However, as in the above-described embodiment, by mounting the stationary shoulder 4 to the support 16, which is slidably connected to the drive unit 3 such that the support 16 and the drive unit 3 are relatively movable in the vertical direction, the pushing force of the stationary shoulder 4 against the front surfaces of the workpieces W and the pushing force of the rotating shoulder 5 against the back surfaces of the workpieces W can be adjusted independently of each other.

Although in the above-described embodiment the stationary shoulder 4 is mounted to the horizontal portion 16b of the support 16 via the urging members 9, the stationary shoulder 4 can be directly fixed to the horizontal portion 16b. However, in a case where the urging members 9 are interposed between the stationary shoulder 4 and the horizontal portion 16b as in the above-described embodiment, even if, for example, there is undulation on the front surfaces of the workpieces W due to manufacturing errors regarding the thickness of the workpieces W, the stationary shoulder 4 can follow the undulation. In a case where the horizontal portion 16b is eliminated, the adjusting mechanism 8 may be provided on the drive unit 3.

Figure 6A:
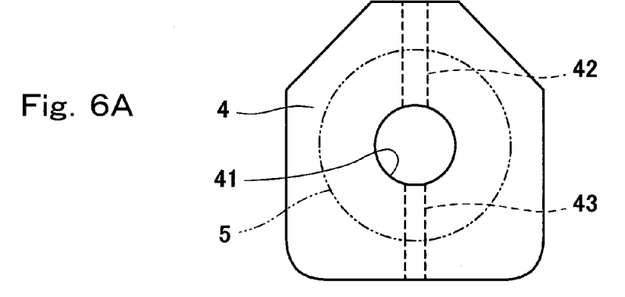
FIG. 6A is a top view of each of stationary shoulders according to respective variations, and FIGS. 6B to 6D each show a stationary shoulder and a rotating shoulder as seen from a direction opposite to a joining direction.
Figure 6B:
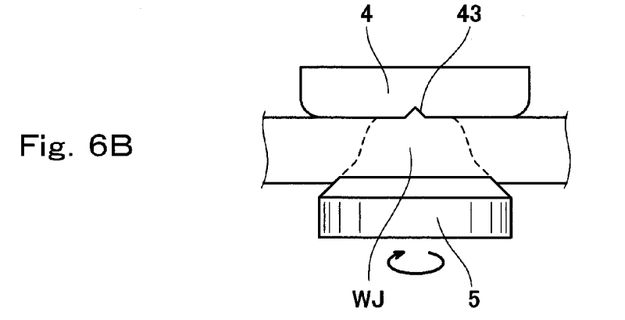
Figure 6C:
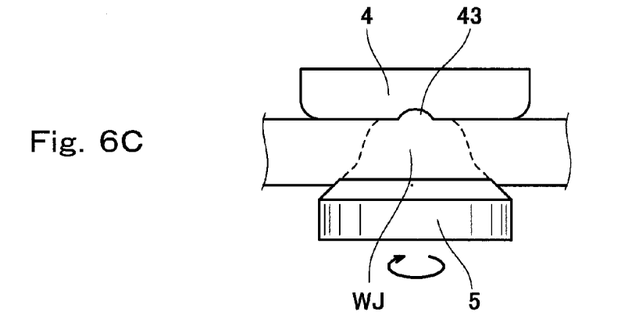
Figure 6D:
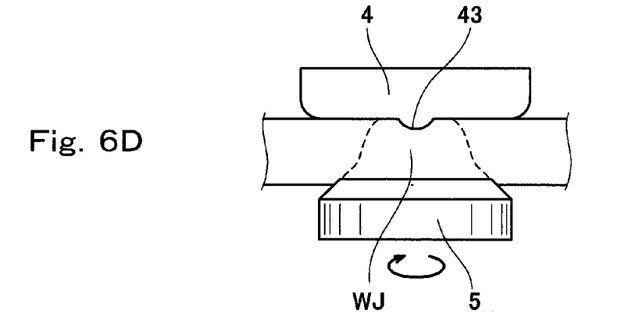

As shown in FIGS. 6A to 6D, a shaping die 43 extending from the central hole 41 in a direction opposite to the joining direction D may be formed in or on the lower surface of the stationary shoulder 4. The shaping die 43 may be a groove as shown in FIG. 6B or 6C, or may be a protrusion as shown in FIG. 6D. For example, the cross-sectional shape of the shaping die 43 may be triangular as shown in FIG. 6B, or may be arc-shaped as shown in FIG. 6C or 6D. If the shaping die 43 is thus formed in or on the lower surface of the stationary shoulder 4, a liner convex or concave can be formed on the front surface side of the weld joint WJ at the same time as performing the joining of the workpieces W.

Figure 7:
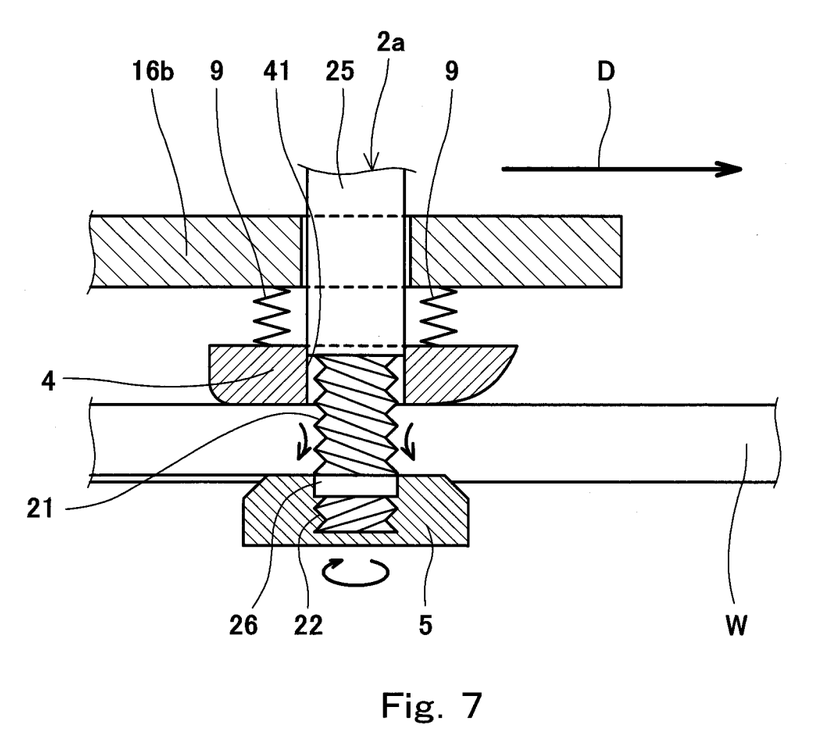
FIG. 7 is an enlarged sectional view of an essential part of a friction stir welding apparatus according to another embodiment.

As shown in FIG. 7, the wire-feeding groove 42 need not be formed in the lower surface of the stationary shoulder 4. In this case, the thread 21 need not be formed on the part of the smaller diameter portion 2a of the rotating shaft 2 where the smaller diameter portion 2a overlaps the stationary shoulder 4.

The pushing force of the rotating shoulder 5 against the back surfaces of the workpieces W is also correlated with the load torque of the motor 32 rotating the rotating shaft 2. Therefore, the pushing mechanism 6 may be configured to operate in accordance with a current value of the motor 32. Also in this case, the pushing force of the rotating shoulder 5 against the back surfaces of the workpieces W can be kept constant.

INDUSTRIAL APPLICABILITY

The present invention is useful for joining various workpieces together by friction stir welding.

REFERENCE SIGNS LIST 1 friction stir welding apparatus
2 rotating shaft
21 thread
3 drive unit
32 motor
4 stationary shoulder
41 central hole
42 wire-feeding groove
43 shaping groove
5 rotating shoulder
6 pushing mechanism
7 urging member
10 wire
W workpiece

The invention claimed is:

1. A friction stir welding apparatus for joining together workpieces abutting each other by friction stir welding, comprising:
   a rotating shaft, on which a thread for friction stirring is formed;
   a rotating shoulder fixed to a distal end of the rotating shaft and configured to rotate together with the rotating shaft to generate frictional heat between the rotating shoulder and back surfaces of the workpieces;
   a drive unit rotatably supporting the rotating shaft on a front surface side of the workpieces, the drive unit including a motor configured to rotate the rotating shaft;
   a pushing mechanism configured to push the rotating shoulder against the back surfaces of the workpieces;
   an L shaped support slidably connected to the drive unit in an axial direction of the rotating shaft, a horizontal portion of the L-shaped support having an opening therein through which the rotating shaft extends; and
   a stationary shoulder penetrated by the rotating shaft and configured to hold the workpieces in a sandwiching manner together with the rotating shoulder, the stationary shoulder being non-rotatably mounted to the horizontal portion of the L-shaped support.

2. The friction stir welding apparatus according to claim 1, further comprising an urging member configured to push the stationary shoulder against front surfaces of the workpieces.

3. The friction stir welding apparatus according to claim 1, further comprising a detector configured to detect a pushing force of the rotating shoulder against the back surfaces of the workpieces, wherein the pushing mechanism is configured to operate in accordance with a detection value of the detector.

4. The friction stir welding apparatus according to claim 1, wherein
the pushing mechanism is configured to operate in accordance with a current value of the motor.

5. The friction stir welding apparatus according to claim 1, wherein
the thread is further formed on a part of the rotating shaft where the rotating shaft overlaps the stationary shoulder, and
a wire-feeding groove, through which a wire made of a material that is able to be stirred together with the workpieces is fed to the thread, is formed in a surface of the stationary shoulder, the surface facing the rotating shoulder, such that the wire-feeding groove extends from a central hole, through which the rotating shaft is inserted, and the wire-feeding groove extends in a joining direction, the joining direction being a direction in which the rotating shaft is moved along a boundary between the workpieces.

6. The friction stir welding apparatus according to claim 5, further comprising a pushing roller disposed in the joining direction relative to the stationary shoulder and configured to push the wire against front surfaces of the workpieces.

7. The friction stir welding apparatus according to claim 1, wherein
a shaping die is formed in or on a surface of the stationary shoulder, the surface facing the rotating shoulder, such that the shaping die extends from a central hole, through which the rotating shaft is inserted, and the shaping die extends in a direction opposite to a joining direction, the joining direction being a direction in which the rotating shaft is moved along a boundary between the workpieces.

8. The friction stir welding apparatus according to claim 1, wherein
the L-shaped support and the drive unit are movable relative to each other in the axial direction of the rotating shaft,
the pushing mechanism moves the drive unit relative to the L-shaped support, and the stationary shoulder is mounted to the L-shaped support.

* * * * *